(12) United States Patent
St. Louis

(10) Patent No.: US 12,510,809 B2
(45) Date of Patent: Dec. 30, 2025

(54) VEHICLE ATTACHABLE CAMERA MOUNT DEVICE

(71) Applicant: Jordan Emmanuel St. Louis, Fayetteville, GA (US)

(72) Inventor: Jordan Emmanuel St. Louis, Fayetteville, GA (US)

(*) Notice: Subject to any disclaimer, the term of this patent is extended or adjusted under 35 U.S.C. 154(b) by 189 days.

(21) Appl. No.: 18/364,402

(22) Filed: Aug. 2, 2023

(65) Prior Publication Data

US 2024/0067105 A1 Feb. 29, 2024

Related U.S. Application Data

(60) Provisional application No. 63/374,113, filed on Aug. 31, 2022.

(51) Int. Cl.
| | | |
|---|---|---|
| *G03B 17/55* | (2021.01) | |
| *G03B 17/56* | (2021.01) | |
| *H04N 23/50* | (2023.01) | |
| *H04N 23/65* | (2023.01) | |
| *H04N 23/695* | (2023.01) | |
| *B60R 11/00* | (2006.01) | |

(52) U.S. Cl.
CPC ........... *G03B 17/55* (2013.01); *G03B 17/561* (2013.01); *H04N 23/50* (2023.01); *H04N 23/65* (2023.01); *H04N 23/695* (2023.01); *B60R 2011/004* (2013.01)

(58) Field of Classification Search
CPC ...... G03B 17/55; G03B 17/561; H04N 23/50; H04N 23/65; H04N 23/695; H04N 23/54; B60R 2011/004; B60R 2011/0056; B60R 11/04

See application file for complete search history.

(56) References Cited

U.S. PATENT DOCUMENTS

| | | | | |
|---|---|---|---|---|
| 10,474,011 | B2* | 11/2019 | Johnson, Sr. | ........... F16M 11/08 |
| 2005/0265711 | A1* | 12/2005 | Heibel | .................... F16M 11/42 |
| | | | | 396/419 |
| 2015/0381859 | A1* | 12/2015 | Cover | .................... H04N 23/51 |
| | | | | 348/374 |
| 2018/0037172 | A1* | 2/2018 | Nelson | ............... F16M 11/2092 |
| 2021/0269172 | A1* | 9/2021 | Jung | ...................... F16M 11/18 |
| 2021/0286237 | A1* | 9/2021 | Zeng | ........................ F16F 15/06 |
| 2023/0349507 | A1* | 11/2023 | Liu | .................... F16M 11/2021 |
| 2023/0353861 | A1* | 11/2023 | Nordquist | ............ H04N 23/661 |

\* cited by examiner

*Primary Examiner* — Shahbaz Nazrul
(74) *Attorney, Agent, or Firm* — Bradley Arant Boult Cummings LLP; Adam J. Thompson, Esq.

(57) ABSTRACT

The vehicle attachable camera mount device is intended to provide users with an automated vehicle attachable camera mount that allows automated camera movements, while being stably attached to an outer surface of a vehicle. To accomplish this, the device utilizes pressure forces from a plurality of suction cups and/or magnetic forces from a plurality of magnets. A streamlined design of the device enables improved aerodynamics and reduced drag force. Further a plurality of motors and electrical components help with the rotational and vertical motion of the camera while being attached to a moving vehicle. More specifically, a user can wirelessly rotate the mounted camera and move the camera vertically up and down using a pre-programmed motherboard and an application. The application can be connected to the camera mount device through a remote-control device via Wi-Fi or Bluetooth.

18 Claims, 15 Drawing Sheets

VEHICLE ATTACHABLE CAMERA MOUNT DEVICE

FIELD OF THE INVENTION

The present invention relates generally to a camera mount that can be attached to an outer surface of a vehicle for pictures and videos for vehicle related sports. More specifically, the present invention can rotate the mounted camera around 360 degrees and move the camera up and down along a vertical axis.

BACKGROUND OF THE INVENTION

In the vehicle racing industry or film industry, cameras are attached to fast-moving vehicles for taking photos or videos. Having the camera attached to the vehicle provides a more realistic and better perspective point of view, increasing the intensity and action of specific scenes. However, the fast-moving vehicle will cause the camera mount to be unstable due to the vibration of the vehicle and wind forces causing a user to have a hard time manually adjusting the camera angle. Therefore, a need exists for a vehicle attachable camera mount that can be stably attached to the vehicle and allows for automated camera rotation movements.

An objective of the present invention is to provide users with a vehicle attachable camera mount device that allows automated camera movements, while being stably attached to an outer surface of a vehicle utilizing pressure forces from a plurality of suction cups and/or magnetic forces from a plurality of magnets. Further, the user of the present invention can wirelessly rotate the mounted camera and move the camera vertically up and down using a pre-programmed motherboard and an application. The application can be connected to the present invention through a mobile device via Wi-Fi or Bluetooth. Additional features and benefits are further discussed in the sections below.

SUMMARY OF THE INVENTION

The vehicle attachable camera mount device is intended to provide users with an automated vehicle attachable camera mount that allows automated camera movements, while being stably attached to an outer surface of a vehicle. To accomplish this, the present invention utilizes pressure forces from a plurality of suction cups and/or magnetic forces from a plurality of magnets. A streamlined design of the present invention helps the device to have improved aerodynamics and reduced drag force. Further, a plurality of motors and electrical components help with the rotational and vertical motion of the camera while being attached to a moving vehicle. More specifically, the user of the present invention can wirelessly rotate the mounted camera and move the camera vertically up and down using a pre-programmed motherboard and an application. The application can be connected to the present invention through a mobile device via Wi-Fi or Bluetooth.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 15, the present invention is a vehicle attachable camera mount device. The present invention may be stably attached to an outer surface of a vehicle and a camera mounted on top of the invention enables to take pictures or videos while the vehicle is moving. Further, the present invention allows a user to manipulate the mounted camera angle by utilizing a mobile application that can connect the mount and the user's mobile device via Wi-Fi or Bluetooth. The mobile application may be a widget or extension that can be utilized on different third-party platforms or electronic devices. The application synchronizes the artificial intelligence and the camera mount device to work in harmony. Furthermore, the camera mount device has the capability of remotely rotating the camera around 360 degrees and moving the camera vertically up and down, using the application and a pre-programmed motherboard.

Figure 1:
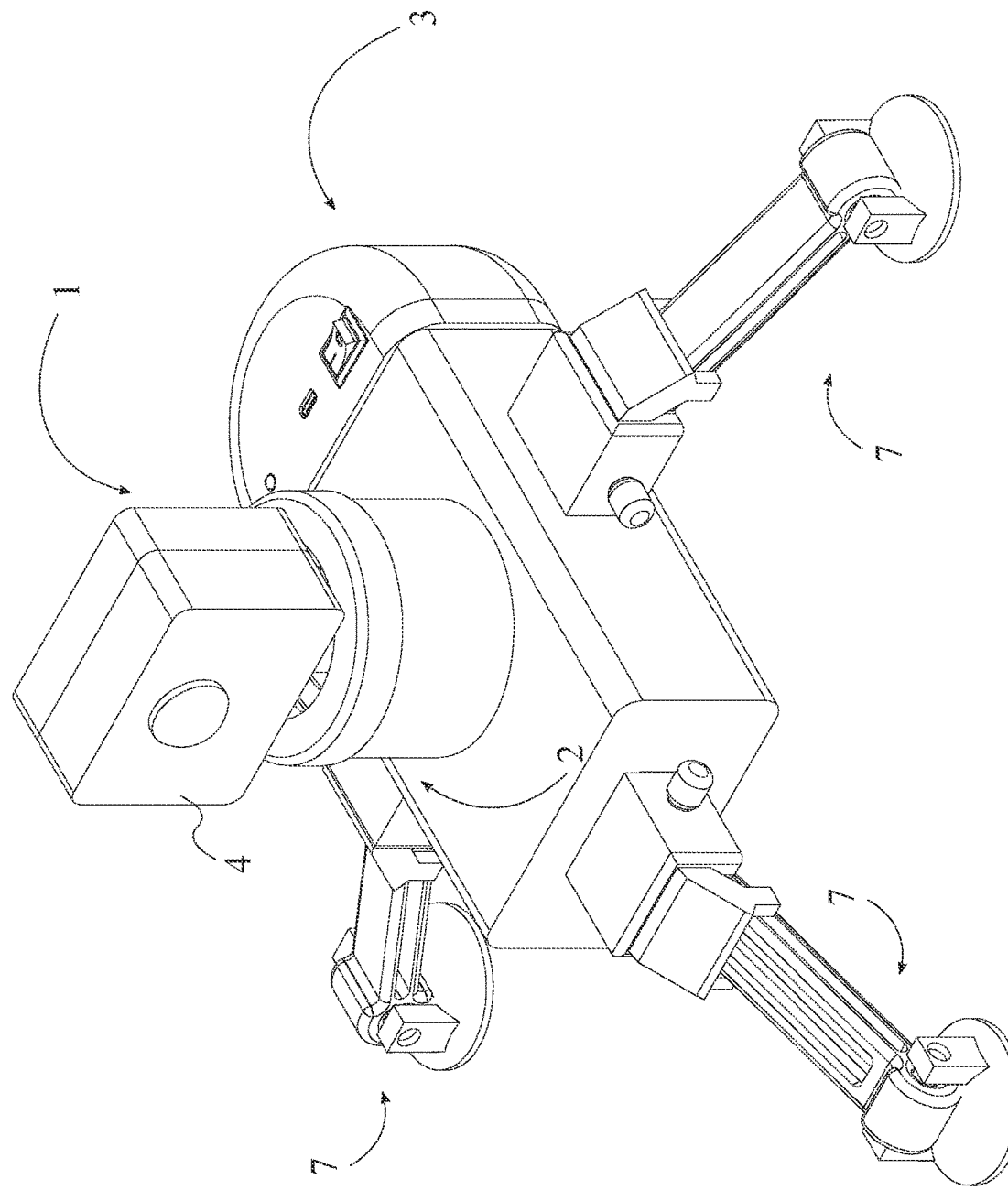
FIG. 1 is a top-front-left perspective view of the present invention, according to a preferred embodiment of the present invention.
Figure 2:
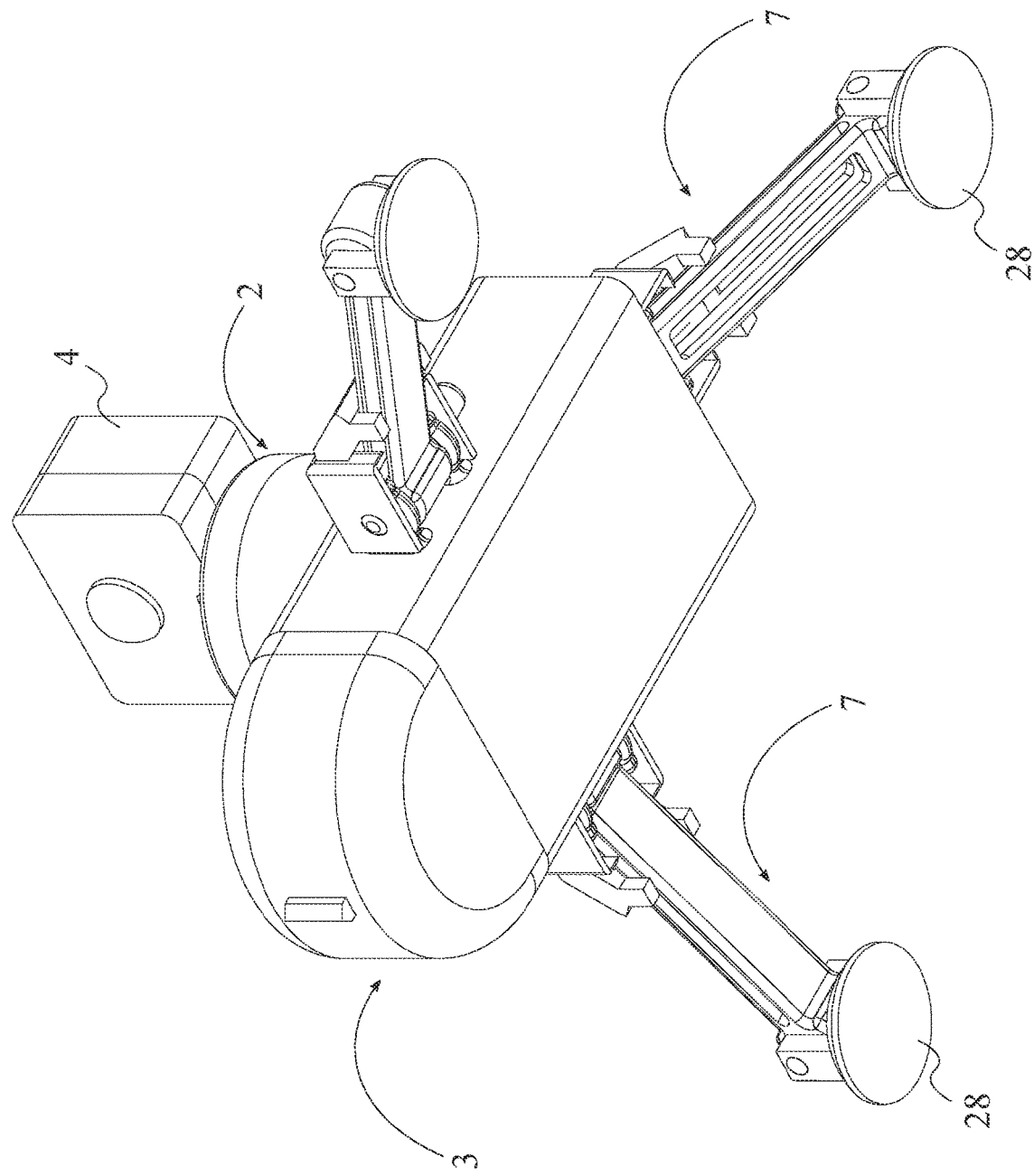
FIG. 2 is a bottom-rear-right perspective view of the present invention.

The following description is in reference to FIG. 1 through FIG. 15. According to a preferred embodiment, the present invention comprises a camera mount assembly 1, a motor housing 2, an electrical housing 3, a camera 4, at least one motor 5, an electrical system 6, and a plurality of aero arms 7. As seen in FIG. 1, the camera mount assembly 1 is mounted onto the motor housing 2 or the motor housing 2 is a base for the camera mount assembly 1. Preferably, the camera mount assembly 1 accommodates the camera 4 or an action camera to be mounted on top, and enables the rotational and vertical motion of the camera 4. To that end, the camera 4 is terminally mounted onto the camera mount assembly 1. In the preferred embodiment, the motor housing 2 accommodates the motor 5, and the motor housing 2 is mounted between the camera mount assembly 1 and the electrical housing 3. In the preferred embodiment, the motor 5 comprises a cylindrical structure and the motor enables rotational motion of the camera 4 through the camera mount assembly 1. However, the motor housing 2 may house any additional motor to enable vertical motion or any other kinds of mechanical motions or orientations, according to the preference of a user. To accomplish this, the motor 5 is mounted within the motor housing 2 and the motor 5 is mechanically connected to the camera mount assembly 1. However, it should be noted that the camera 4, and the motor 5 may comprise any brand, technology, size, components, arrangement of components etc. that are known to one of ordinary skill in the art, as long as the intents of the present invention are not altered. In order to protect the electrical and electronic components of the present invention from outside factors, the electrical system 6 is mounted within the electrical housing 3. Further, to enable the smooth operation of the camera according to the preferences of the user, the electrical system 6 is electrically and electronically connected to the motor 5. As seen in FIG. 1 through FIG. 9, the electrical housing 3 is a rectangular structure with a rounded terminal end positioned below the motor housing 2. However, the electrical housing 3 and the motor housing 2 may comprise any shape, size, material, components, arrangement of components, etc. that are known to one of ordinary skill in the art, as long as the intents of the present invention are not altered. The plurality of aero arms 7 allows stable connection with the vehicle's outer surface. To that end, the plurality of aero arms 7 is laterally mounted onto and distributed along lateral side walls of the electrical housing 3. Further, the plurality of aero arms 7 extends away from the electrical housing 3. This is so that, terminal ends of the aero arms positioned away from the electrical housing 3 enable stable attachment of the aero arms onto an external surface of a vehicle. Furthermore, the motor 5 and the electrical system 6 are operably connected to the camera mount assembly 1, wherein operating the electrical system 6 governs rotational and linear motion of the camera 4 In other words, through the commands and electrical power received from the electrical system 6, and the mechanical power imparted by the motor 5, the camera 4 on the camera mount assembly 1 can rotate and/or move up and down accordingly while being attached to a moving vehicle.

A more detailed description of the present invention follows.

Figure 3:
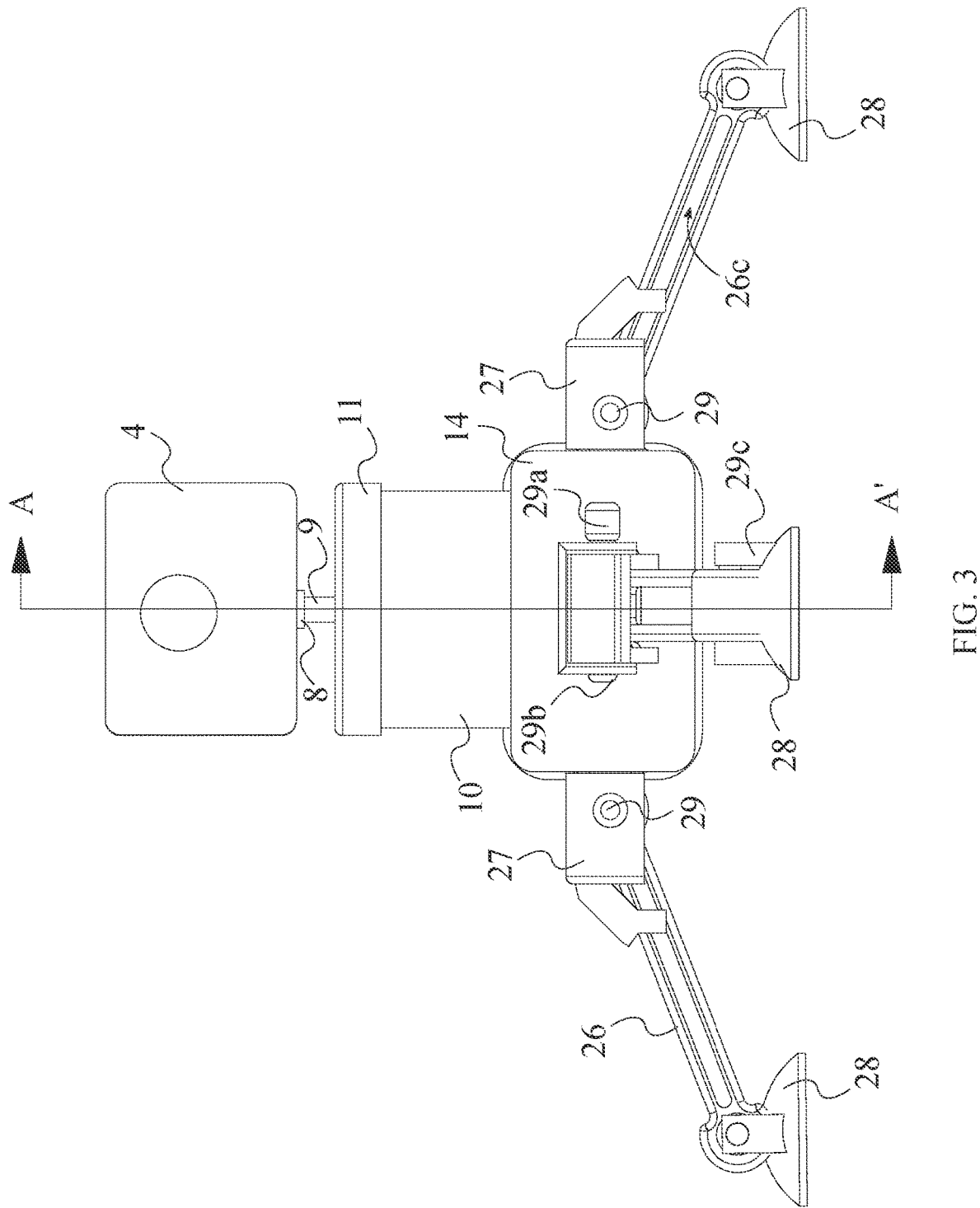
FIG. 3 is a front elevational view of the present invention.
Figure 4:
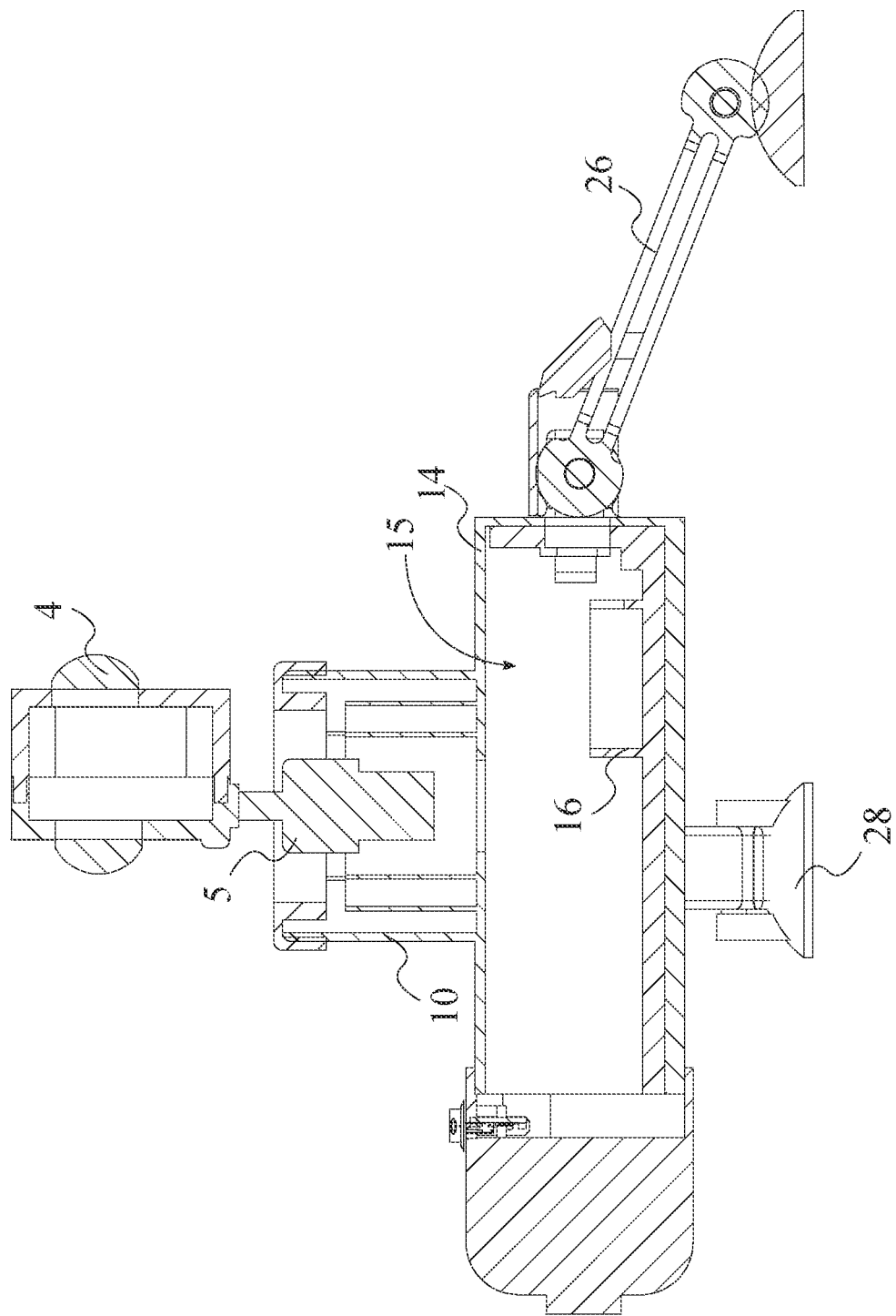
FIG. 4 is a sectional view of the present invention taken along A-A' of FIG. 3.
Figure 7:
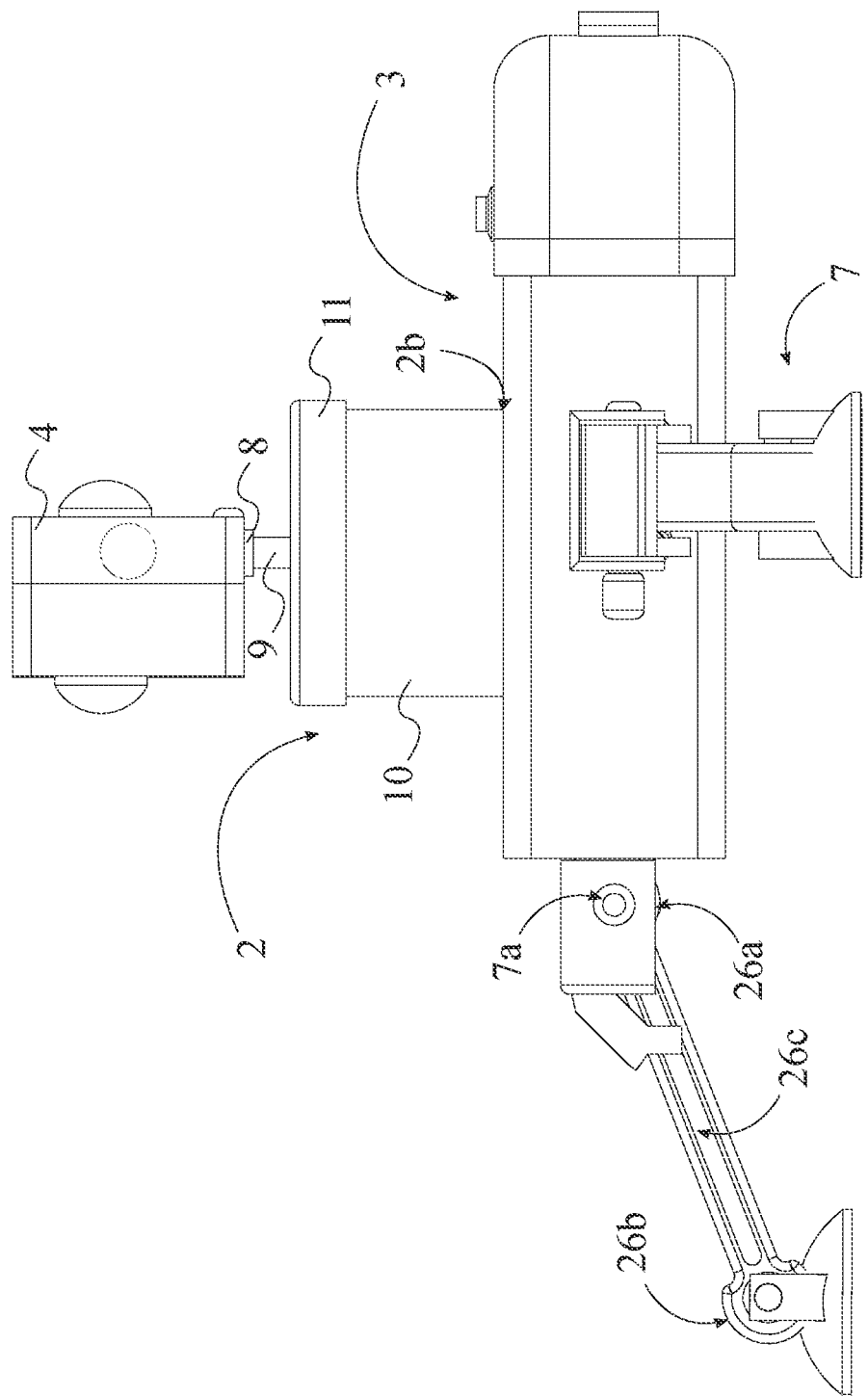
FIG. 7 is a side elevational view of the present invention.

As seen in FIG. 3 and FIG. 7, the camera mount assembly 1 comprises a camera holder 8 and a motor assembly stem 9, wherein the camera holder 8 is mounted onto a terminal end of the motor assembly stem 9. Preferably, the motor assembly stem is a segment that is protruding out from the motor housing 2 that carries the electrical and mechanical connections to the camera 4 as well as the motor 5. In other words, the motor assembly stem 9 is operably connected to the motor 5, wherein operating the motor 5 enables rotation of the camera holder 8 through the motor assembly stem 9. It should be noted that the motor assembly stem 9 may comprise any shape, size, material, components, arrangement of components etc. that are known to one or ordinary skill in the art, as long as the intents of the present invention are not altered.

Figure 8:
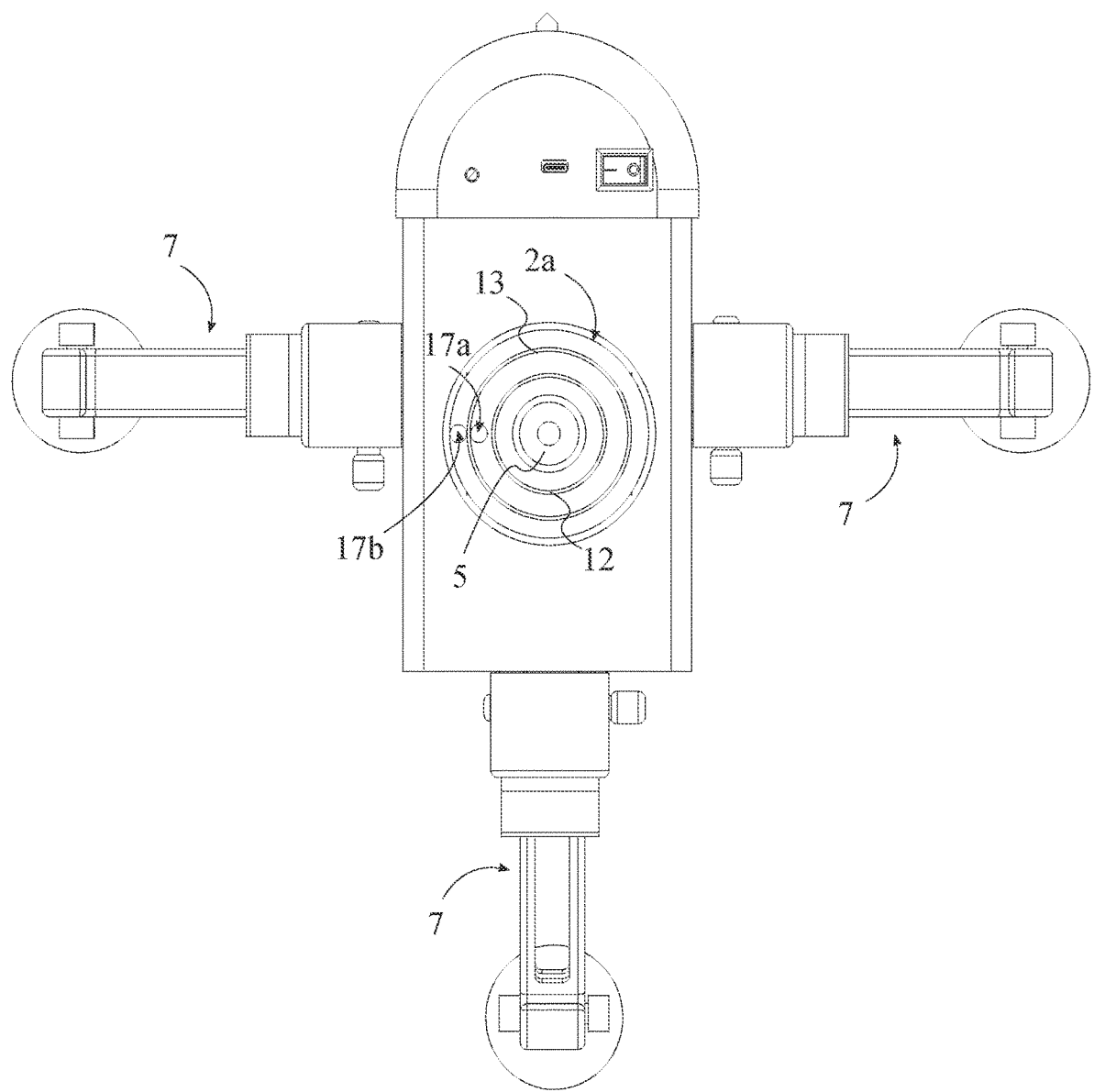
FIG. 8 is a top plan view of the present invention, wherein the camera is not shown to provide an interior view of the motor housing.
Figure 9:
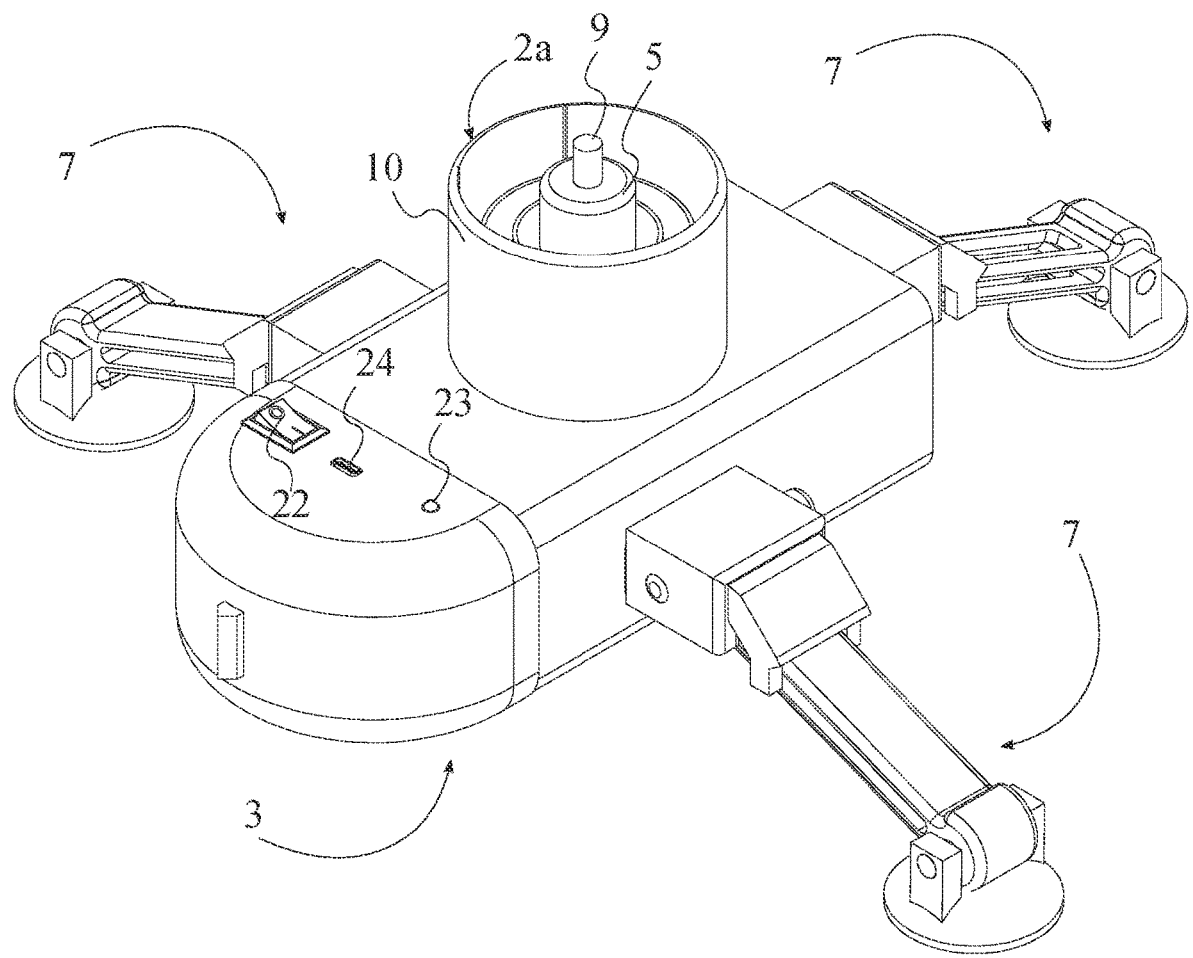
FIG. 9 is a top rear right perspective view of the present invention, wherein the camera is not shown.
Figure 10:
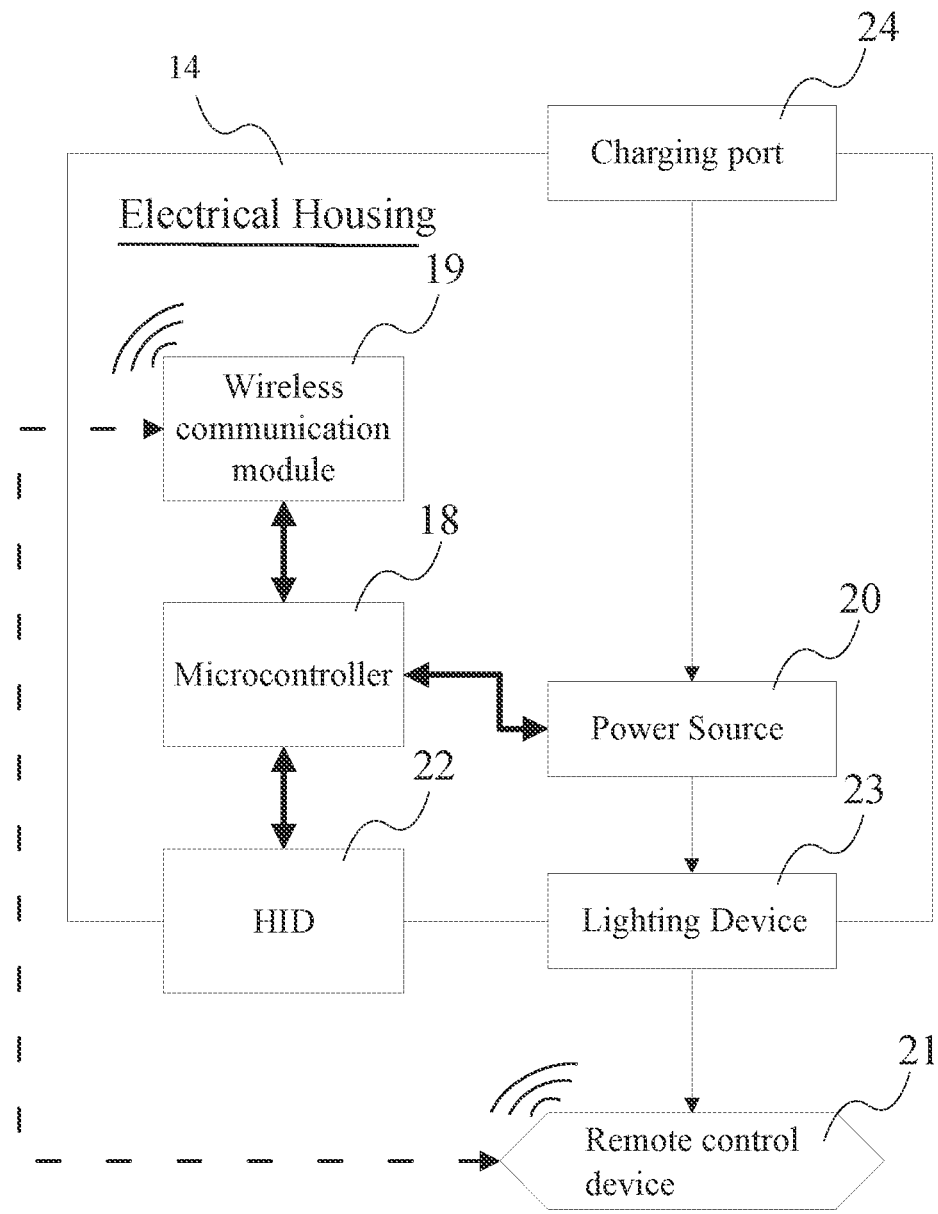
FIG. 10 is a block diagram of the present invention, wherein thinner flowlines represent electrical connections between components, thicker flowlines represent electronic connections between components, and dashed flow lines indicate the components being communicably coupled.
Figure 11:
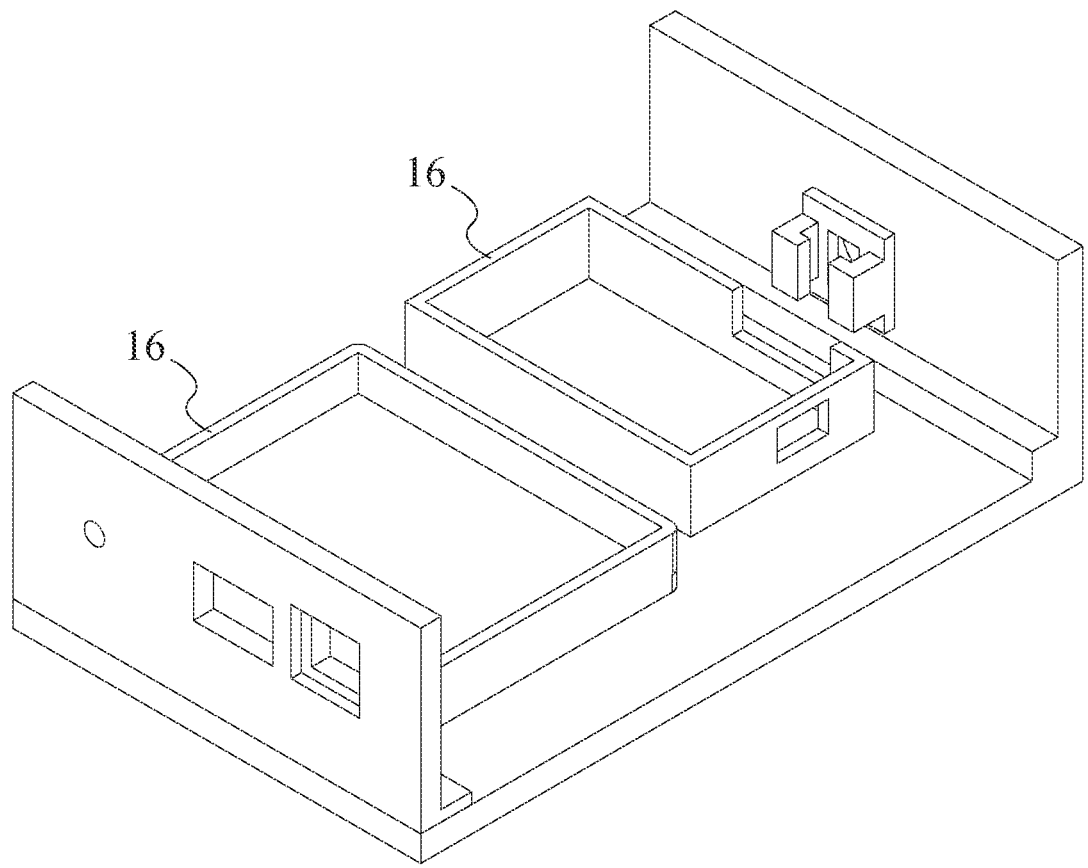
FIG. 11 is a top front perspective view of an internal tray of the present invention.

In the preferred embodiment, the motor housing 2 comprises a motor receptacle 10, a motor housing cap 11, an internal copper layer 12, and an external copper layer 13. Preferably, the motor receptacle 10 is the compartment or container that houses the motor 5 and as seen in FIG. 8 and FIG. 9, the motor receptacle 10 is a hollow cylinder. Further, the motor 5 is centrally positioned within the motor receptacle 10. As seen in FIG. 1 and FIG. 7, the motor housing cap 11 is a cover that is positioned on a top end of the motor housing receptacle 10. In other words, the motor housing cap 11 is perimetrically mounted onto a first end 2a of the motor housing 2, wherein the first end 2a constitutes the top edge of the motor receptacle 10. However, the motor receptacle 10 and the motor housing cap 11 may comprise any other any shape, size, material, components, arrangement of components etc. that are known to one or ordinary skill in the art, as long as the intents of the present invention are not altered. As seen in FIG. 8, the internal copper layer 12 and the external copper layer 13 are circularly mounted around the motor 5 within the motor housing 2, and they provide a ring design. Preferably, the copper layers of the present invention allow the motor 5 built into the motor receptacle 2 to still have access to power while on a 360-degree turning cover. More specifically, the internal copper layer 12 changes polarity based off computational signals of 12V and GND, wherein a bottom connection for a wire to be soldered into it which is wherein the signal has an entry point. Similarly, the external copper layer 13 changes polarity based off computational signals of 12V and GND, wherein a bottom connection for a wire to be soldered into it which is where the signal has an entry point. Furthermore, as seen in FIG. 8, the internal copper layer 12 is laterally offset from the external copper layer 13.

Figure 12:
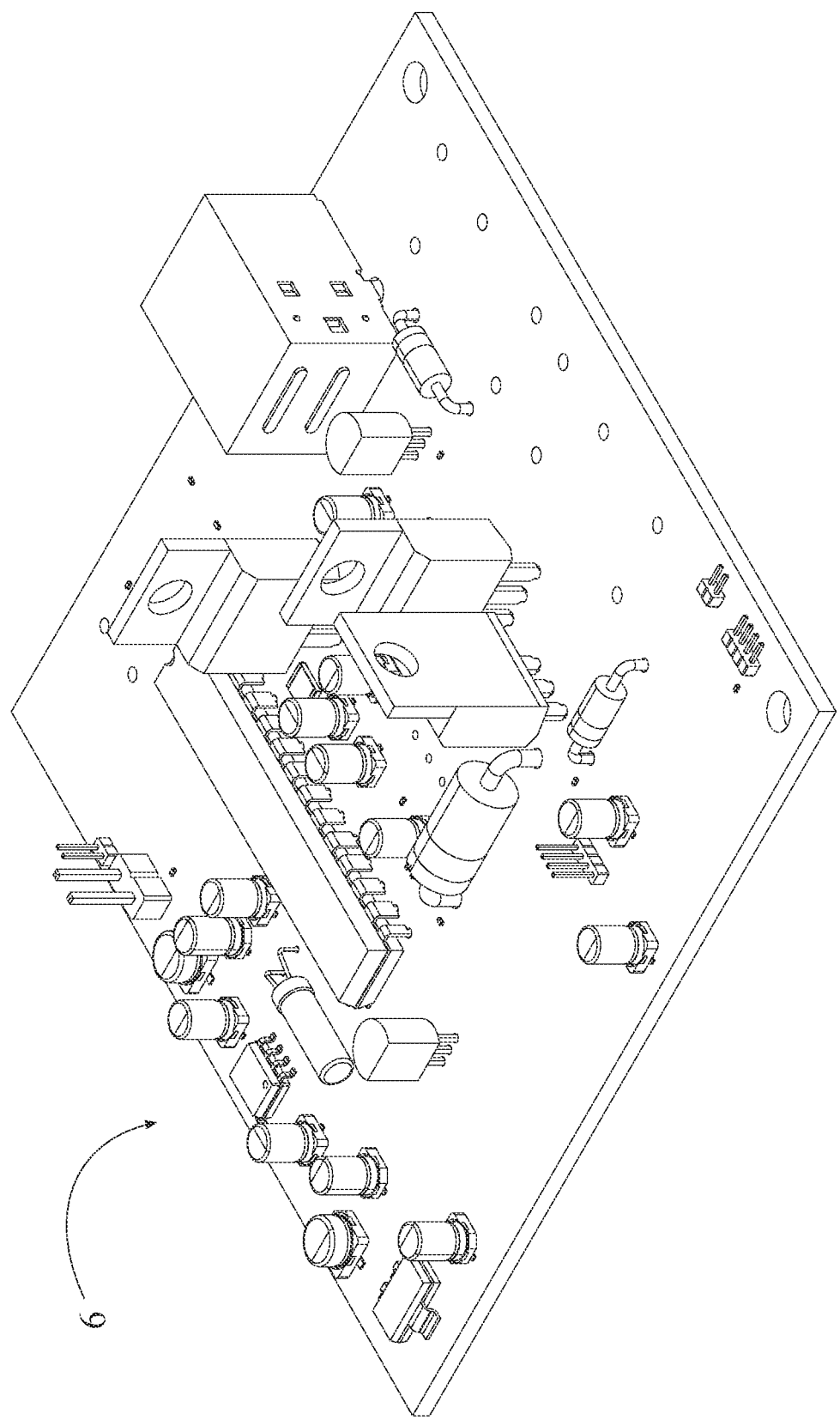
FIG. 12 is a top front perspective view of an electrical system or mother board of the present invention.
Figure 13:
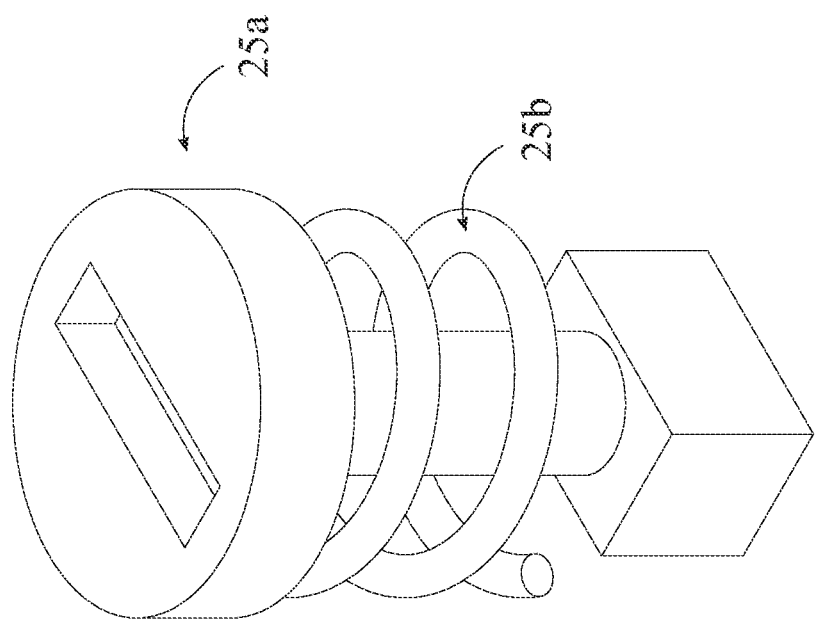
FIG. 13 is a top front perspective view of the locking mechanism of the present invention.

Continuing with the preferred embodiment, the electrical housing 3 comprises an electrical receptacle 14, an internal cavity 15, a plurality of trays 16, and a plurality of apertures 17. As clearly seen in FIG. 7, the electrical receptacle 14 is mounted onto a second end 2b of the motor housing 2, wherein is the second end 2b of the motor receptacle is positioned opposite to the first end 2a of the motor housing 2. More specially, the second end 2b constitutes a bottom end of the motor housing 2 and the first end of the motor housing 2 constitutes the top end of the motor housing 2. Preferably, the electrical receptacle 14 is an outer shell that accommodates electrical components of the present invention (for example, a motherboard as can be seen in FIG. 12, a battery, a USB accepter, LED lights, a power switch, etc.). To that end, the internal cavity 15 resides inside the electrical receptacle 14 or is positioned within the electrical receptacle 14. To further compartmentalize various components within the electrical receptacle 14, the plurality of trays 16 is positioned within the internal cavity 15. In other words, the electrical system 6 is positioned within the plurality of trays 16. Further, the plurality of apertures 17 traverses into the internal cavity 15 through the electrical receptacle 14. The plurality of apertures 17 comprises various holes and gaps that run through the electrical receptacle to hold certain components as well as to enable connectivity. For example, two holes 17a and 17b from the plurality of apertures 17 seen on the electrical receptacle on FIG. 8, enables wires to pass through that connects the internal copper layer 12 and the external copper layer 13 to the electrical system 6. In reference to FIG. 10, the electrical system 6 comprises a microcontroller 18, a wireless communication module 19, and a power source 20. Preferably, the microcontroller 18 is the central component of the device that controls all the other components and functionalities of the device. Preferably, the microcontroller 18 is a PCB (printed circuit board) that hosts various integrated modules and components, makes decisions and provides logic to the camera device. It is an aim of the present invention, to connect to the present invention through a mobile device via Wi-Fi or Bluetooth. To accomplish this, the wireless communication module 19 is integrated into the present invention through the PCB. Preferably, the wireless communication module 19 comprises Wi-Fi and Bluetooth capabilities, such that the wireless communication module 19 may communicate with external devices via wireless data transmission protocols. Example standards of what the wireless communication module 19 is capable of using includes, but are not limited to, Bluetooth, WI-FI, GSM, CDMA, ZigBee, etc. The power source 20 provides electrical power to the components of the present invention. Preferably, the power source 20 is a rechargeable battery that provides extended operational time. Further, the battery supports quick charging via USB-C, ensuring rapid recharging during breaks. However, any other source of power, or a combination of the following sources may be employed for the smooth functioning of the camera device. Examples of such power sources include, but are not limited to, wired external power sources, magnetic power converters, solar power converters, etc. Thus, to enable smooth functioning, the microcontroller 18 is electrically connected to the power source 20, the microcontroller 18 is electronically connected to the motor 5 and the wireless communication module 19, and the wireless communication module 19 is communicably connected to a remote-control device 21. In the preferred embodiment of the present invention, the remote-control device 21 functions as the remotely accessible computing device that wirelessly transmits commands to the camera mount device. Examples of remote-control devices include, but are not limited to, smart phone, tablet, desktop computer, etc. In a first alternative embodiment the remote-control device may be a remote server that issues commands to the present invention.

Continuing with the preferred embodiment, the electrical system 6 comprises a HID (human interface device) 22, a lighting device 23, and a charging port 24. Preferably, the HID 22, the lighting device 23 and the charging port 24 are integrated along the electrical receptacle. Examples of various operations that may be performed by the HID 22, includes, but are not limited to, turning the device power on/off, turning on/off a record process, start/stop playback, and various other operations based on the capacities and modules on the microcontroller 18. The lighting device 23 is preferably an LED that can indicate the status of charge present in the device. The charging port 24 may be a USB port or any other port, that enables charging and/or data transfer through the port.

Figure 6:
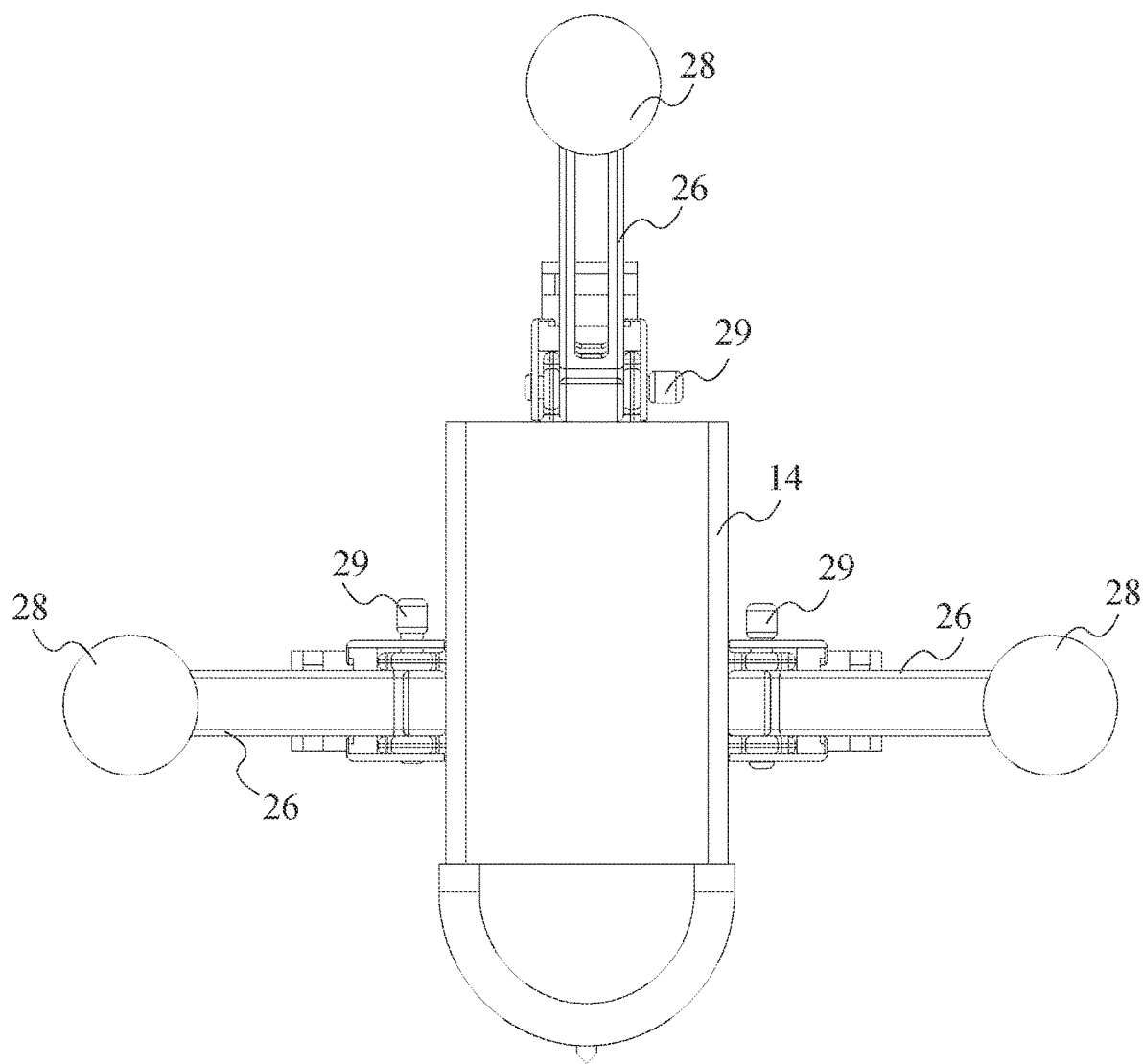
FIG. 6 is a bottom elevational view of the present invention.

In the preferred embodiment, the present invention comprises a locking mechanism 25, wherein the locking mechanism 25 is laterally integrated onto the electrical housing 3. Preferably, the locking mechanism 25 comprises a bolt structure 25a and a loaded spring 25b. The locking mechanism 25 allows the user to open the electrical receptacle 14 for replacing the battery or any electrical components that are accommodated within the inner cavity 15. To that end, the locking mechanism 25 is latched onto an internal slot of a tray from the plurality of trays 16. As can be seen in FIG. 6, the bolt structure 25a comprises a hole, a stem, and a block. The hole is for a flat head screw to allow the locking mechanism to be gripped. The block holds onto the inner bridge when the locking mechanism 25 is twisted horizontally. The loaded spring 25b ejects the stem of the locking mechanism 25 on a vertical twist.

Figure 5:
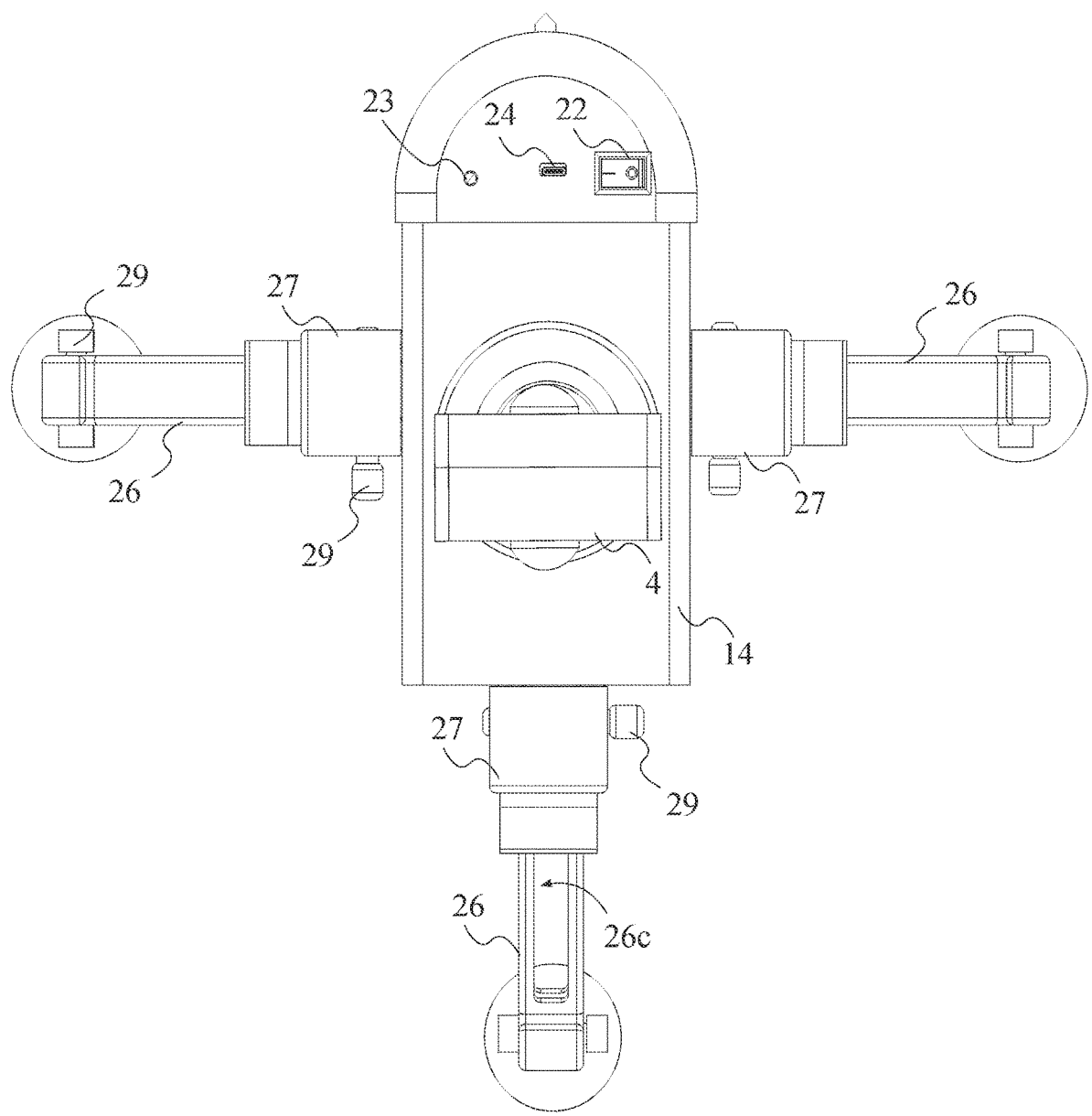
FIG. 5 is a top elevational view of the present invention.

For efficient latching to an external surface of a vehicle, each of the plurality of aero arms 7 comprises an arm 26, a stabilizer 27, a suction cup 28, and a plurality of fasteners 29. Preferably, each arm 26 comprises a first end 26a and a second end 26b, wherein the first end 26a of the arm is positioned opposite to the second end 26b of the arm across a length of the arm 26. Preferably the stabilizer 27 is mounted adjacent to the first end 26a of the arm, wherein the stabilizer 27 connects the arm to the electrical housing 2. To attach the plurality of aero arms 7 to the vehicle, the suction cup 28 is mounted adjacent to the second end 26b of the arm 26. Preferably, the suction cup 28 is magnetic. Further, the plurality of fasteners 29 is integrated between the arm 26, the stabilizer 27, and the suction cup 28. As seen in FIG. 3 and FIG. 5, the plurality of fasteners 29 comprises at least one of a stem 29a, a stem cap 29b, and a suction cup connector 29c. More specifically, in the preferred embodiment, the stem 29a provides a bolt structure that keeps all armature components together alongside working with the stem cap 29b. The stem cap 29b is a rounded cover that comprises an opening for the stem 29a. The suction cup 28 is attached to the bottom end of the aero arm using the suction cup connector 29c.

In order to allow greater aero flow which increases the aerodynamics of the present invention, each of plurality of arm 26 comprises an air vent 26c, wherein the air vent 26c traverses through the arm 26. Further, the outer structure of the present invention provides a streamlined design to have improved aerodynamics and reduced drag force. Furthermore, the plurality of aero arms 7 further comprises a plurality of holes 7a, that traverses through the stabilizer 27. The plurality of holes 7a enables the user to attach the various fasteners 29, stabilizers 27, and suction cups 28 to the arm 26.

Figure 14:
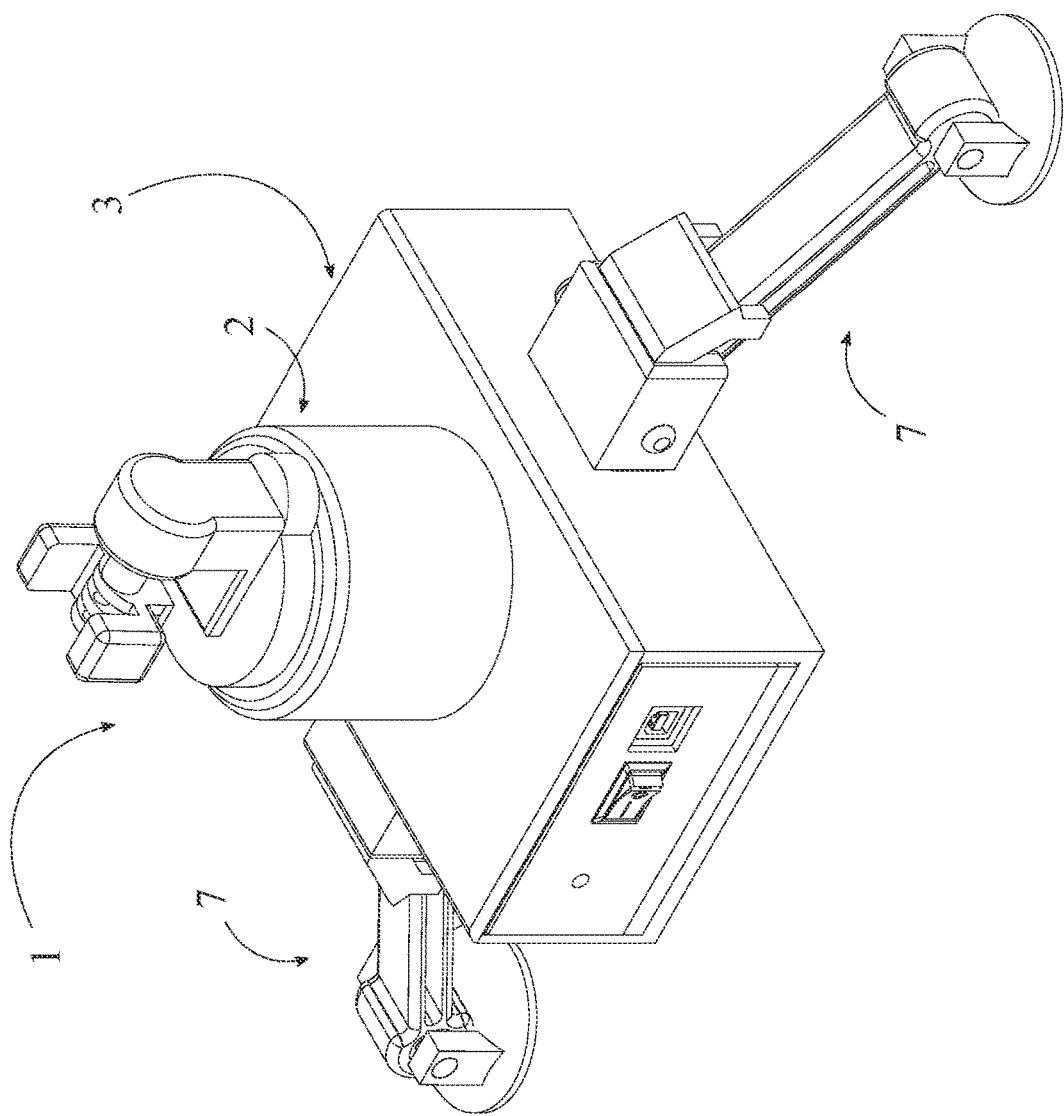
FIG. 14 is a top front perspective view of an alternate embodiment of the present invention, wherein the camera mount assembly comprises a vertical robotic arm mounted on a base plate.
Figure 15:
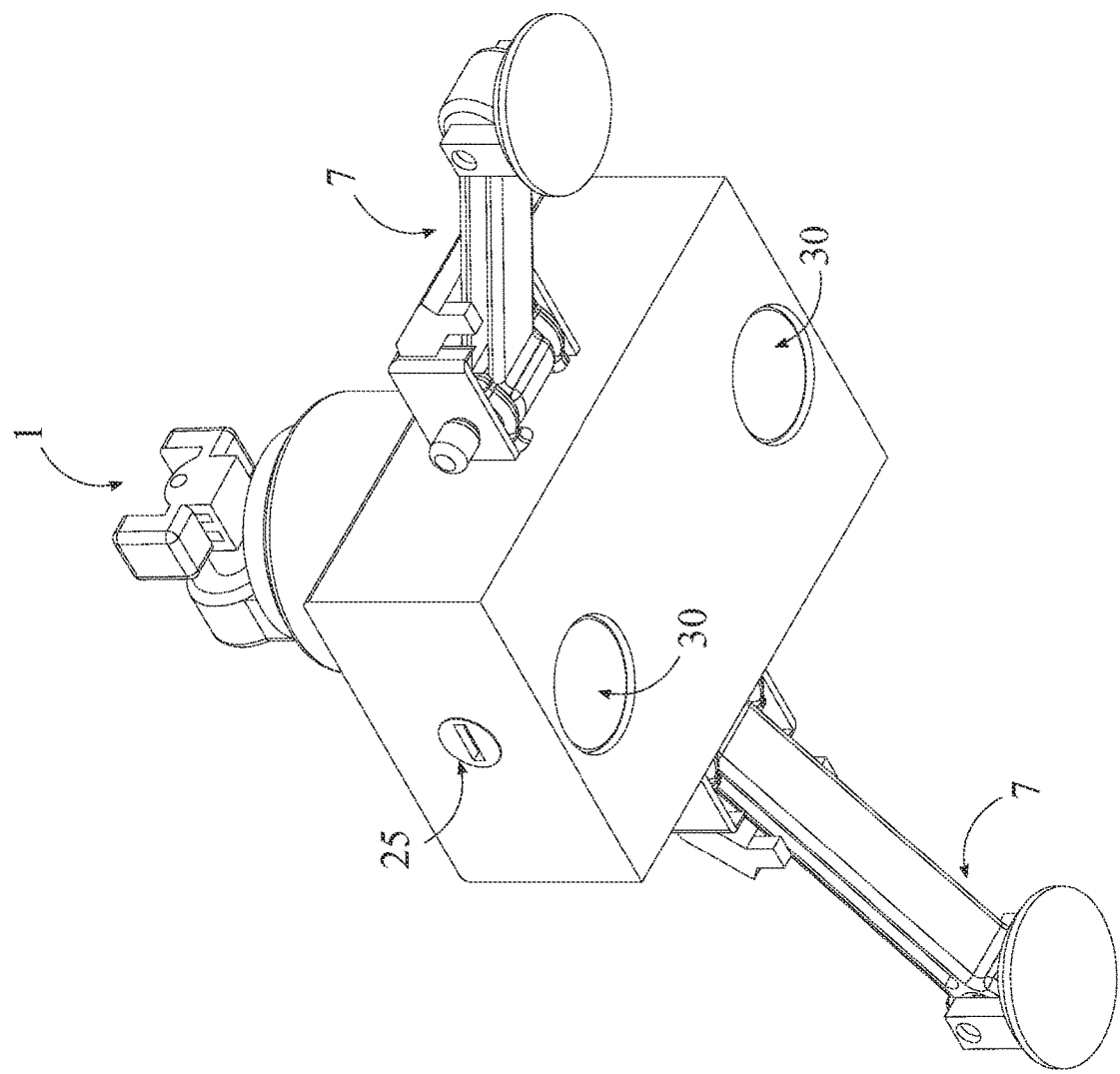
FIG. 15 is a bottom perspective view of the alternate embodiment of the present invention, wherein a plurality of magnetic housings with magnets is positioned on the bottom surface of the electrical housing.

In reference to FIG. 14 and FIG. 15 the camera mount assembly 1 comprises a vertical robotic arm, the motor house covering 11 forms a base for the camera mount assembly 1, and the electrical housing 3 is rectangular in shape. Further, a bottom surface of the electrical housing 3 comprises a plurality of magnetic housing 30 with magnets that helps with attaching the present invention efficiently to a vehicle surface.

Although the invention has been explained in relation to its preferred embodiment, it is to be understood that many other possible modifications and variations can be made without departing from the spirit and scope of the invention as hereinafter claimed.

What is claimed is:

1. A vehicle attachable camera mount device comprising:
   a camera mount assembly;
   a motor housing;
   an electrical housing comprising an electrical receptacle, an internal cavity, a plurality of trays, and a plurality of apertures, wherein
   the electrical receptacle being mounted onto a second end of the motor housing, wherein the second end of the motor housing is positioned opposite to a first end of the motor housing;
   the internal cavity being positioned within the electrical receptacle;
   the plurality of trays being positioned within the internal cavity; and
   the plurality of apertures traversing into the internal cavity through the electrical receptacle;
   a camera;
   at least one motor;
   an electrical system;
   a plurality of aero arms;
   the camera mount assembly being mounted onto the first end of the motor housing;
   the motor housing being mounted between the camera mount assembly and the electrical housing;

the camera being terminally mounted onto the camera mount assembly;
the motor being mounted within the motor housing;
the motor being mechanically connected to the camera mount assembly;
the electrical system being mounted within the electrical housing;
the electrical system being electrically connected to the motor;
the plurality of aero arms being laterally mounted onto and distributed along lateral side walls of the electrical housing;
the plurality of aero arms extending away from the electrical housing; and
the motor and the electrical system being operably connected to the camera mount assembly, wherein operating the electrical system governs rotational and linear motion of the camera.

2. The vehicle attachable camera mount device of claim 1 comprising:
the camera mount assembly comprising a camera holder and a motor assembly stem;
the camera holder being mounted onto a terminal end of the motor assembly stem; and
the motor assembly stem being operably connected to the motor, wherein operating the motor enables rotation of the camera holder through the motor assembly stem.

3. The vehicle attachable camera mount device of claim 1 comprising:
the motor housing comprising a motor receptacle, a motor housing cap, an internal copper layer, and an external copper layer;
the motor being centrally positioned within the motor receptacle;
the motor housing cap being perimetrically mounted onto a first edge of the motor housing, covering the motor receptacle;
the internal copper layer and the external copper layer being circularly mounted around the motor; and
the internal copper layer being laterally offset from the external copper layer.

4. The vehicle attachable camera mount device of claim 1, comprising:
the electrical system comprising a microcontroller, a wireless communication module, and a power source;
the microcontroller being electrically connected to the power source;
the microcontroller being electronically connected to the motor and the wireless communication module; and
the wireless communication module being communicably connected to a remote-control device.

5. The vehicle attachable camera mount device of claim 1, comprising:
the electrical system comprising a HID (human interface device), a lighting device, and a charging port; and
the HID, the lighting device and the charging port being integrated along the electrical receptacle.

6. The vehicle attachable camera mount device of claim 1, wherein the electrical system is positioned within the plurality of trays.

7. The vehicle attachable camera mount device of claim 1 comprising:
a locking mechanism; and
the locking mechanism being laterally integrated onto the electrical housing.

8. A vehicle attachable camera mount device comprising:
a camera mount assembly;
a motor housing;
an electrical housing;
a camera;
at least one motor;
an electrical system;
a plurality of aero arms;
the camera mount assembly being mounted onto a first end of the motor housing;
the motor housing being mounted between the camera mount assembly and the electrical housing;
the camera being terminally mounted onto the camera mount assembly;
the motor being mounted within the motor housing;
the motor being mechanically connected to the camera mount assembly;
the electrical system being mounted within the electrical housing;
the electrical system being electrically connected to the motor;
the plurality of aero arms being laterally mounted onto and distributed along lateral side walls of the electrical housing;
the plurality of aero arms extending away from the electrical housing;
the motor and the electrical system being operably connected to the camera mount assembly, wherein operating the electrical system governs rotational and linear motion of the camera; and
a locking mechanism comprising a bolt structure and a loaded spring, the locking mechanism being laterally integrated onto the electrical housing.

9. The vehicle attachable camera mount device of claim 1, comprising:
each of the plurality of aero arms comprising an arm, a stabilizer, a suction cup, and a plurality of fasteners;
the arm comprising a first end and a second end, wherein the first end of the arm is positioned opposite to the second end of the arm across a length of the arm;
the stabilizer being mounted adjacent to the first end of the arm, wherein the stabilizer connects the arm to the electrical housing;
the suction cup being mounted adjacent to the second end of the arm; and
the plurality of fasteners being integrated between the arm, the stabilizer, and the suction cup.

10. The vehicle attachable camera mount device of claim 9, wherein the plurality of fasteners comprises at least one of a stem, a stem cap, and a suction cup connector.

11. The vehicle attachable camera mount device of claim 9, comprising:
an air vent;
a plurality of holes;
the air vent traversing through the arm; and
the plurality of holes traversing through the stabilizer.

12. The vehicle attachable camera mount device of claim 9, wherein the suction cup is magnetic.

13. A vehicle attachable camera mount device comprising:
a camera mount assembly;
a motor housing;
an electrical housing;
a camera;
at least one motor;
an electrical system;
a plurality of aero arms;
the camera mount assembly comprising a camera holder and a motor assembly stem;

the camera mount assembly being mounted onto a first end of the motor housing;

the motor housing being mounted between the camera mount assembly and the electrical housing;

the camera holder being mounted onto a terminal end of the motor assembly stem;

the camera being terminally mounted onto the camera holder;

the motor being mounted within the motor housing;

the motor being mechanically connected to the camera mount assembly through the motor assembly stem;

the electrical system being mounted within the electrical housing;

the electrical system being electrically connected to the motor;

the plurality of aero arms being laterally mounted onto and distributed along lateral side walls of the electrical housing;

the plurality of aero arms extending away from the electrical housing; and the motor and the electrical system being operably connected to the camera mount assembly, wherein operating the electrical system governs rotational and linear motion of the camera;

the motor housing comprising a motor receptacle, a motor housing cap, an internal copper layer, and an external copper layer;

the motor being centrally positioned within the motor receptacle;

the motor housing cap being perimetrically mounted onto a first edge of the motor housing, covering the motor receptacle;

the internal copper layer and the external copper layer being circularly mounted around the motor; and the internal copper layer being laterally offset from the external copper layer.

14. The vehicle attachable camera mount device of claim 13 comprising:

the electrical housing comprising an electrical receptacle, an internal cavity, a plurality of trays, and a plurality of apertures;

the electrical receptacle being mounted onto a second end of the motor housing, wherein is the second end of the motor receptacle is positioned opposite to the first end of the motor housing;

the internal cavity being positioned within the electrical receptacle;

the plurality of trays being positioned within the internal cavity; and the plurality of apertures traversing into the internal cavity through the electrical receptacle.

15. The vehicle attachable camera mount device of claim 14, comprising:

the electrical system comprising a microcontroller, a wireless communication module, a power source, a HID (human interface device), a lighting device, and a charging port;

the microcontroller being electrically connected to the power source;

the microcontroller being electronically connected to the motor and the wireless communication module;

the wireless communication module being communicably connected to a remote-control device; and the HID, the lighting device and the charging port being integrated along the electrical receptacle.

16. The vehicle attachable camera mount device of claim 13 comprising:

a locking mechanism; and the locking mechanism being laterally integrated onto the electrical housing.

17. The vehicle attachable camera mount device of claim 13, comprising:

each of the plurality of aero arms comprising an arm, a stabilizer, a suction cup, and a plurality of fasteners;

the arm comprising a first end and a second end, wherein the first end of the arm is positioned opposite to the second end of the arm across a length of the arm;

the stabilizer being mounted adjacent to the first end of the arm, wherein the stabilizer connects the arm to the electrical housing;

the suction cup being mounted adjacent to the second end of the arm; and the plurality of fasteners being integrated between the arm, the stabilizer, and the suction cup.

18. The vehicle attachable camera mount device of claim 17, comprising:

an air vent; and the air vent traversing through the arm.

* * * * *